Nov. 2, 1965  J. W. TAMPLEN  3,215,208
SEALING DEVICES
Filed June 8, 1961
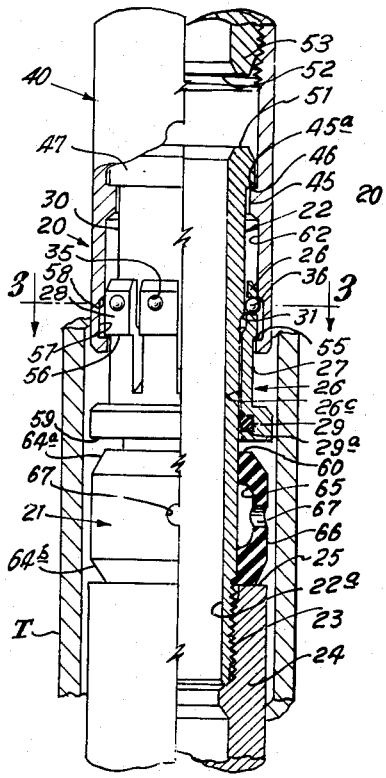
Fig. 1
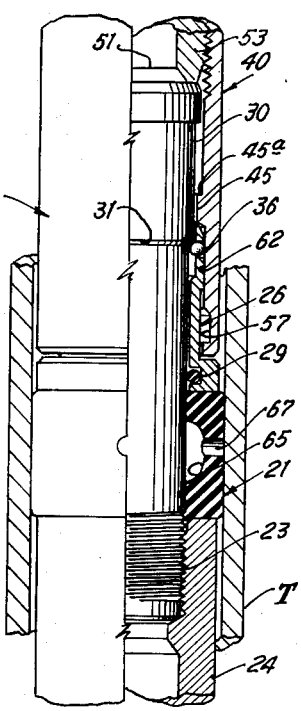
Fig. 2
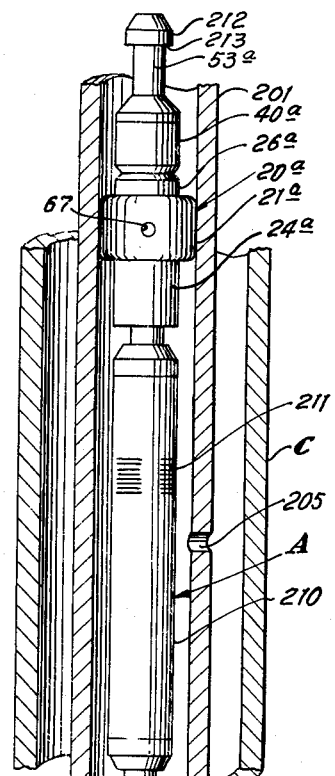
Fig. 4
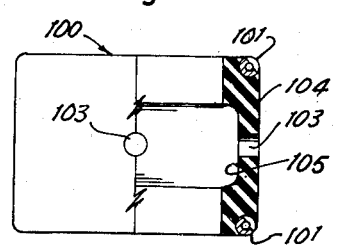
Fig. 3
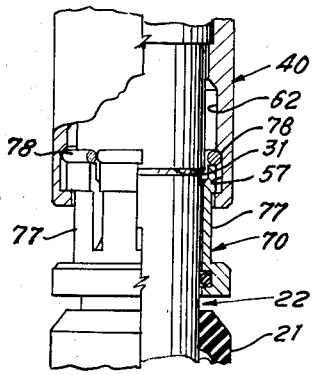
Fig. 5
Fig. 6
INVENTOR
Jack W. Tamplen
BY
ATTORNEYS

United States Patent Office 3,215,208
Patented Nov. 2, 1965

3,215,208
SEALING DEVICES
Jack W. Tamplen, Celina, Tex., assignor to Otis Engineering Corporation, Dallas, Tex., a corporation of Delaware
Filed June 8, 1961, Ser. No. 115,812
10 Claims. (Cl. 166—198)

This invention relates to sealing devices and more particularly to sealing devices for effecting a fluid-tight seal between adjacent surfaces.

One object of this invention is to provide a new and improved sealing device.

Another object is to provide a new and improved sealing device for sealing the gap between a tubular flow conductor and an object disposed therein.

Still another object is to provide a new and improved sealing device for sealing the annular gap between a pair of tubular flow conductors disposed in telescoped relationship to one another.

A further object is to provide a new and improved sealing device for providing a fluid-tight seal within the bore of a tubular flow conductor and which is effective against fluid pressures acting in either longitudinal direction of the flow conductor.

A still further object is to provide a sealing device for a flow conductor, such as tubing or pipe, which is of small outside diameter relative to the inner diameter of the flow conductor in which it is used, so that it will readily pass through the bore of the flow conductor without damage or abrasion, and which is readily expandable into sealing engagement with the inner wall of the flow conductor.

A still further object is to provide a sealing device comprising a resilient elastic element which is expandable to effect a fluid-tight seal between adjacent surfaces wherein compression of the resilient expansible portion is limited to a predetermined value.

Another object is to provide a new and improved resilient sealing element which is expandable upon compression to a sealing engagement with a flow conductor and which is held in sealing position by a pressure differential acting in either longitudinal direction across the sealing element in the flow conductor.

Still another object is to provide a sealing element which has anti-extrusion means for preventing extrusion of the sealing element.

Additional objects and advantages of the invention will be readily apparent from the reading of the following description of a device constructed in accordance with the invention, and with reference to the accompanying drawings thereof, wherein:

FIGURE 1 is a fragmentary elevational view, partly in section, showing a sealing device embodying the invention in retracted non-sealing position in a well tubing;

FIGURE 2 is a view similar to FIGURE 1 showing the sealing device in expanded sealing position;

FIGURE 3 is a sectional view taken on the line 3—3 of FIGURE 1;

FIGURE 4 is a fragmentary view, partly in section, showing sealing devices embodying this invention in use with a pack-off gas lift assembly installed in a well tubing string;

FIGURE 5 is a fragmentary view, partly in section, showing a modified form of an expanding and lock means of the sealing device of FIGURES 1 and 2; and FIGURE 6 is a view, partly in section, of a modified form of the resilient expandable sealing element employed in the sealing device of this invention.

Referring now particularly to FIGURES 1 and 2 of the drawing, the sealing device 20 embodying the invention is shown disposed within a flow conductor such as a well tubing string T. The sealing device includes an elastic, resilient sealing element 21 which is annular in form and slidably mounted about a tubular mandrel 22 having a bore 22a. To the lower end of the mandrel is attached, as by threads 23, a lower sub 24 whose upwardly facing end 25 supports the sealing element and limits downward displacement of the sealing element relative to the mandrel.

A cylindrical expander 26, having an internal bore 26c, is slidably mounted on the tubular mandrel above the sealing element and is adapted to be moved downwardly on the mandrel into engagement with the sealing element to compress and expand the sealing element. The expander is provided with upwardly extending fingers 27 having external bosses 28 at the upper free ends thereof. An O-ring 29 received within an internal annular groove 29a of the expander effects a seal between the expander and the mandrel to prevent the flow of fluids therebetween.

The mandrel 22 has an enlarged upper portion 30 thereof which provides an inwardly and downwardly extending external annular shoulder 31. The inner bore 26c of the expander is enlarged at its upper portion so that the fingers are adapted to telescope over the enlarged portion 30 of the mandrel, as shown in FIGURE 1.

The fingers 27 of the expander are each provided with an aperture 35 extending transversely therethrough and in which a ball 36 is disposed for radial movement relative to the expander. When the expander is slidably positioned on the mandrel with the apertures of the fingers adjacent the enlarged mandrel portion 30, the balls 36 project outwardly of the bosses of the expander fingers and are held in such expander or projecting positions by the external surface of the enlarged portion of the mandrel.

A locking operator sleeve 40 is telescoped on mandrel 22 with a lower portion thereof also telescoped about the expander 26. The locking sleeve is provided with an internal annular flange 45. Upward movement of the locking sleeve relative to the mandrel is limited by the engagement of the upwardly facing shoulder 45a of the internal flange 45 with a downwardly facing external shoulder 46 provided by the external annular flange 47 of the mandrel. Downward movement of the locking sleeve relative to the mandrel is limited by engagement of the upper end 51 of the mandrel with the lower end 52 of an upper sub 53 which extends within the upper end portion of the locking sleeve and is threadedly connected thereto.

When the locking sleeve is in its uppermost position relative to the mandrel, as shown in FIGURE 1, the expander is supported on the locking sleeve by an internal annular upwardly facing shoulder 55 formed on the locking sleeve which engages the downwardly facing shoulders 56 provided by the bosses on the ends of the expander fingers. The outwardly projecting portions of the balls 36 which are now held in expanded positions by the enlarged portion 30 of the mandrel, are received in an internal annular recess 57 of the locking sleeve. The balls engage the inner wall of the locking sleeve within the recess 57 thereof and abut a downwardly and outwardly extending annular shoulder 58 of the locking sleeve which is provided by the recess. The balls thus prevent the locking sleeve from moving downwardly relative to the expander and the engagement of the upwardly facing shoulder 55 of the locking sleeve with the downwardly facing shoulders 56 of the expander fingers prevents the locking sleeve from moving upwardly relative to the expander. Thus, it is apparent that the locking sleeve and expander element are locked together against longitudinal movement relative to one another as long as the surface of the enlarged portion 30 of the mandrel is engaged by the balls 36.

A conventional line running and pulling tool, such as the running and pulling tool disclosed in U.S. Patent 2,348,563 to H. C. Otis, may be employed to engage the upper sub 53 and force the locking sleeve downwardly relative to the mandrel when it is desired to expand the sealing element. Of course, other suitable means for moving the locking sleeve may also be employed.

As the locking sleeve is moved from its uppermost position to its lowermost position, as shown in FIGURE 2, the engagement of its downwardly facing internal shoulder 58 with the balls 36 also causes the expander to move downwardly since the balls, confined within the apertures 35 of the expander fingers, transmit the downward force exerted on the locking sleeve to the expander. During such downward movement of the expander, its lower annular end surface 59 engages the upper end 60 of the sealing element 21 to compress the sealing element downwardly against the upper end 25 of the lower sub 24, thus causing the sealing element to expand radially outwardly.

As soon as the expander 26 has been moved downwardly a distance great enough to cause the balls 36 to move below the downwardly facing shoulder 31 of the mandrel, the balls are cammed inwardly by the annular shoulder 58 of the locking sleeve out of the recess 57 of the locking sleeve and out of engagement with the surface 30 of the mandrel. This inward movement of the balls disengages the balls from the shoulder 58 and frees the locking sleeve for downward movement relative to the expander. The locking sleeve is thus permitted to move further downwardly relative to the expander. The internal surface of the locking sleeve above the recess 57 now holds the balls in engagement with the outer surface of the mandrel and the engagement of the balls with the shoulder 31 of the mandrel locks the expander against upward displacement relative to the mandrel. In this position, with the balls 36 abutting the shoulder 31, the expander element is locked in its lower position on the mandrel.

It will thus be seen that the sealing element when engaged by the expander element can only be compressed to a degree determined by the limit of downward movement of the expander. The lowermost positions of the expander and locking sleeve are thus designed to permit compression of the sealing element to a predetermined degree which is sufficient to cause the sealing element to engage the inner wall of the tubing and effect a fluid-tight seal between the mandrel and tubing but will not result in overstress of the sealing element.

It will further be seen that the expander cannot be moved upwardly to permit relaxation of the sealing element until the locking sleeve is lifted sufficiently to align its internal recess 57 with the balls 36 to allow them to move out of engagement with the downwardly facing shoulder 31 of the mandrel and thus permit upward movement of the expander on the mandrel.

The sealing element 21, which is adapted to seal between the tubing and the mandrel, is formed of rubber or other suitable resilient material and is provided with an outside diameter such that the element will pass readily through the bore of the tubing string with ample clearance.

The upper and lower annular leading surfaces 64a and 64b of the sealing element are outwardly convergent to facilitate movement of the sealing element past obstructions in the tubing as the device is lowered or raised therein. Further, if desired, the external diameter of the sealing element may be made slightly smaller than that of the expander 26 and the lower sub 24 to protect the sealing element against abrasion and wear which might otherwise be caused by the dragging engagement of the sealing element with the wall of the flow conductor.

The sealing element is formed with an internal annular recess 65, to provide a relatively thin and flexible side wall portion 66 which renders the element more readily compressible and expansible. A plurality of lateral apertures 67 formed in the thin wall section of the sealing element communicate the exterior thereof with the internal recess 65. The apertures prevent the trapping of fluid of low pressure or atmospheric pressure between the mandrel and the sealing element within the recess 65, which trapped fluids would otherwise cause the sealing element to collapse out of sealing engagement with the tubing under greater external pressures applied thereto.

Referring to FIGURE 2, it will be seen that fluid pressure acting on the sealing element from below will tend to extrude the element into the gap between the tubing and the expander 26. The fluid pressure, however, will readily pass between the tubing and the sealing element until reaching the apertures 67 which permit the fluid to enter the recess 65 and equalize the fluid pressure in the recess with the pressure from below. The upper portion of the sealing element now acts in the manner of a conventional cup type seal and is held by the fluid pressure from below in expanded sealing engagement with the tubing. In a similar manner, if fluid pressure from above the sealing element exceeds the pressure from below, the fluid from above would also pass between the tubing and the element and into the recess 65 through the apertures 67 thereby equalizing the pressures in the recess with the pressure from above. Consequently, the lower portion of the sealing element, like the upper portion thereof, also acts like a convenional cup type seal and is held by the fluid pressure from above in expanded position in sealing engagement with the tubing. It will be apparent that the sealing element constitutes, in effect, a pair of oppositely facing cup type seals which will withstand pressure differentials in either longitudinal direction in the well tubing and will effectively seal regardless of the direction of the pressure differential in the tubing.

A modified form of expander element 70, which may also be used in the sealing device 20 in place of the expander element 26 is shown in FIGURE 5. The expander element 70 is similar to the expander element 26 but is provided with shorter fingers 77 having squared ends. In addition, instead of the locking balls 36 and apertures 35 in the fingers for receiving and supporting the balls, the expander element has a plurality of arcuate shaped lock segments 78 which are made of wire or other similar rod-like material and supported on the squared ends of the expander fingers. If desired, the segments may be substituted for by a split ring which is normally biased outwardly to an external diameter corresponding to the diameter of the locking sleeve recess 57. The lock segments, like the balls 36, are adapted to cooperate with the downwardly facing shoulder 58 of the lock sleeve as the lock sleeve moves downwardly to move the expander downwardly and expand the sealing element into sealing engagement with the tubing. Like the balls, 36, the lock segments are also adapted to engage with the downwardly facing shoulder 31 of the mandrel and the locking sleeve for locking the expander against upward movement relative to the mandrel when the locking sleeve is in its lowermost position. The lock segments of the expander 70 provide a greater bearing area for cooperatively engaging the mandrel and locking sleeve than is obtainable with the balls 36 of the expander 26. The sealing device when equipped with an expander element 70 can thus withstand much greater pressure differentials than when equipped with the expander 26.

A modified form of sealing element 100 which also may be used in the sealing device 20 is shown in FIGURE 6. As previously noted, a pressure differential acting on the sealing element 21 tends to extrude its resilient material into the annular gap between the tubing wall and the expander 26, or between the tubing wall and lower sub 24, depending upon the direction of the pressure differential. The sealing element 100 is provided with anti-extrusion members 101 which enable it to withstand much higher pressure differentials than the sealing element 21. Like the sealing element 21, the sealing element 100 is provided with a thin flexible wall 104, the lateral apertures 103 and an internal recess 105 and is otherwise substantially identical to the sealing element 21. The anti-extrusion members 101 are in the form of close-coiled tension garter springs and are superposed about the periphery of the sealing element 100 at both its upper and lower ends. Preferably, the anti-extrusion members 101 are molded into the sealing element at the time the sealing element is formed. When the sealing element is expanded to sealing position, each anti-extrusion member 101 is stretched while creates small spaces between its adjacent coils. However, these spaces are so minute in comparison to the annular gap between the expander element and the tubing or the lower sub and the tubing that it is comparatively negligible. In actual practice it has been found that the sealing element 100 with anti-extrusion members is able to withstand several times as much pressure differential as the sealing element 21 which does not have such anti-extrusion members.

Regardless of whether sealing element 21 or 100 is used, upstream pressure will be trapped in the internal annular recess when the pressure exterior of the sealing element is reduced. This is because the sealing element acts as a pair of oppositely facing cup type seals. To move the sealing element longitudinally in the well tubing when it is thus inflated would be very damaging to the sealing element. It is important, therefore, that at the beginning of the removal operation, when the expander sleeve is unlocked, the sealing element is distorted longitudinally by the trapped pressure in the direction of the expander to permit such trapped pressure to escape between the sealing element and the mandrel and between the sealing element and the expander, thereby opening the lateral ports of the sealing element and completely freeing it of any trapped pressure by providing open communication between the recess and the exterior of the sealing element. The spacing of the lower end 59 of the expander 26 from the upwardly facing shoulder 25 of the sub 24, being greater than the length of the sealing element 21, as clearly shown in FIGURES 1 and 5, a slight space is provided between the downwardly facing lower end 59 of the expander and the upwardly facing shoulder 60 of the sealing element which permits movement of the sealing element to its completely relaxed position and permits further longitudinal distortion of the sealing element to provide for escape of trapped pressure from within the space 65 in the sealing element as just described.

In FIGURE 4 is illustrated the use of the sealing device of this invention as the pack-off gas lift assembly A installed within a producing gas well. The installation is similar to the Otis Pack-Off Gas Lift Installation illustrated on page 4294 of the Composite Catalog of Oil Field Equipment and Services, 1960 edition.

The gas lift assembly is disposed within a tubing string T suspended within a well casing C. The tubing string is made up of a plurality of tubing sections, such as the sections 201 and 202, which are joined by a coupling 203. The coupling 203 of the tubing string with the ends of the tubing sections provide recesses 204. A lateral port 205 is provided in the tubing section 201 to admit gas into the tubing string from the annulus between the tubing and the well casing. A collar stop 206 of any suitable type is installed within the tubing string so that its outwardly projecting lugs or bosses 207 are disposed within the first coupling recess 204 of the tubing below the lateral port 205 to lock the stop to the tubing against upward or downward movement therein.

The pack-off gas lift assembly A consists primarily of a gas lift valve 210 to which sealing devices 20a and 20b are attached at the upper and lower ends thereof. A gas lift valve which may be used in the assembly is disclosed in the U.S. Patent No. 2,642,889 to L. L. Cummings.

The sealing devices 20a and 20b are connected to the opposite ends of the valve by their sub sections 24a and 24b, respectively, whereby the locking sleeve 40b and connecting sub or collet 53b of the lower device comprises the lower end of the assembly and the locking sleeve 40a and sub 53a of the upper device comprise the upper end portion of the assembly. The upper sub 53a of the upper sealing device 20a is provided with a pulling flange 212, the downwardly facing shoulder 213 of which is adapted to be engaged by conventional tools, such as a flexible line running and pulling tool by which the assembly may be installed and removed from the tubing.

When it is desired to install the assembly in the tubing, the assembly is lowered therein until the sub or collet 53b engages the collar stop 206 whereupon one of the sealing devices is disposed above the lateral port 205 and the other is below. Gas entering the tubing T through the port 205 cannot escape past either of the sealing devices but can enter the gas lift valve through the slots 211.

The conventional line running and pulling tool by which the assembly is lowered into the tubing and which is engageable with the upper sub 53a of the upper sealing device may be employed to effect the compression and expansion of the sealing elements 21a and 21b. The sealing element of the lower sealing device, which engages the collar stop 206 and is attached to the gas lift valve in inverted relation to the upper sealing device, will be compressed and expanded in response to downward force imparted to the assembly by the running and pulling tool. Downward force acting on the assembly will cause the assembly to move downwardly relative to the locking sleeve 40b whereupon the lower sealing element 21b will be compressed and expanded into sealing engagement with the tubing. Further downward force acting on the upper sub 53a of the upper sealing device will also cause the sealing element 21a to expand into sealing engagement with the tubing.

Thus, with the sealing element in sealing engagement with the inner wall of the tubing, the gas lift valve is adapted to control the admission of gas from the tubing casing annulus into the production stream passing through the central passage of the assembly.

It will be noted that the lower connecting sub 53b is provided with collet fingers 53c having outwardly projecting bosses 53d which releasably engage the collar stop in an internal recess 215 in the bore 216 of the collar stop. Thus, in removal of the gas lift assembly, as the assembly is moved upwardly, the locking sleeve 40b will be restrained by engagement of the bosses 53d with the downwardly facing shoulder 217 formed by the recess in the collar stop until the locking sleeve reaches its fully unlocked position, after which further upward movement of the assembly disengages the collet fingers from the collar stop.

The applications of the sealing device disclosed herein, of course, are not limited to the particular application illustrated in FIGURE 4. The sealing devices are adapted for use with a wide variety of well tools such as safety valves, regulators, well head plugs, bridge plugs, and the like, the subs 53 and 24 being adapted to be connected to other elements of such well tools.

It will thus be seen that a sealing device for a flow conductor, such as tubing or pipe, is disclosed herein which is of small outside diameter relative to the inner diameter of the flow conductor in which it is used so that it will readily pass through the bore of the flow conductor without damage or abrasion, and which is readily expandable into sealing engagement with the inner wall of the flow conductor.

It will further be seen that the sealing device disclosed herein comprises a resilient elastic portion which is readily expansible to effect a fluid-tight seal between adjacent surfaces wherein compression of the resilient, expansible portion is limited to a predetermined amount.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A sealing device comprising: a mandrel; tubular elastic expansible seal means on said mandrel; means on said mandrel movable longitudinally with respect to said seal means to engage opposite ends of said seal means for compressing said seal means in a longitudinal direction of said mandrel and expanding said seal means in a transverse direction of said mandrel; means on said mandrel limiting movement of said compressing means with respect to said seal means for limiting the compression of said seal means by said compressing and expanding means; means on said mandrel and said compressing means coengageable when in a predetermined position with respect to said mandrel for locking said compressing and expanding means in compression and expanding position, said locking means being movable to a second predetermined position with respect to said mandrel for disengagement from locking position to release said compressing and expanding means for movement from said compressing and expanding position to permit said seal means to return to unexpanded position.

2. A sealing device for use in a flow conductor comprising: a mandrel, said mandrel having an external annular shoulder; expansible seal means on said mandrel; expander means on said mandrel for compressing said seal means against said shoulder in a longitudinal direction of said mandrel and expanding said seal means in a transverse direction to said mandrel to an initial sealing position, said expander means when in a first position on said mandrel being spaced longitudinally of said mandrel from said shoulder on said mandrel a distance greater than the length of said expansible seal means and being movable on said mandrel between said first position wherein said seal means is in a normally relaxed condition surrounding said mandrel between said mandrel shoulder and said expander means and a second position on said mandrel nearer said shoulder wherein said expander means compresses said seal means against said shoulder; operator means on said mandrel for moving said expander means from said first position to said second position; means on said seal element conducting fluid pressure from the exterior thereof to the interior thereof for further setting of said seal element in sealing position by such fluid pressure; and lock means on said mandrel, said expander and said operator means releasably locking said expander means in said second position to prevent movement of said mandrel and expander member from seal member expanding position by fluid pressure acting on said seal member.

3. A sealing device for use in a flow conductor comprising: a mandrel, said mandrel having an external annular shoulder; expansible seal means on said mandrel; expander means on said mandrel for compressing said seal means against said shoulder in a longitudinal direction of said mandrel and expanding said seal means in a transverse direction of said mandrel to an initial sealing position, said expander means when in a first position on said mandrel being spaced longitudinally of said mandrel from said shoulder on said mandrel a distance greater than the length of said expansible seal means and being movable on said mandrel between said first position wherein said seal means is in a normally relaxed condition surrounding said mandrel between said mandrel shoulder and said expander means and a second position on said mandrel nearer said shoulder wherein said expander means compresses said seal means against said shoulder; operator means movable on said mandrel engageable with said expander means for moving said expander means on said mandrel from said first position to said second position; locking means on said mandrel, said expander member and said operator means for releasably locking said expander means in said second position on said mandrel for holding said expansible seal means in said initially expanded position, said locking means being releasable upon longitudinal movement of said operator means relative to said mandrel away from said shoulder to free said expander means for movement from said second position to said first position on said mandrel.

4. A sealing device for use in a flow conductor comprising: a mandrel, said mandrel having an external annular shoulder; elongate tubular expansible seal means on said mandrel adjacent said shoulder; expander means on said mandrel at the opposite end of said seal means from said shoulder and movable toward said shoulder for expanding said seal means in a transverse direction of said mandrel; means for mounting said expander means for movement longitudinally of said mandrel from a first position on said mandrel spaced from said shoulder a distance greater than the length of said seal means disposed between said expander means and said shoulder whereby said expander means is movable to a second position on said mandrel nearer said shoulder toward said shoulder to engage said seal means and compress said seal means against said shoulder thereby expanding said seal means transversely of said mandrel into an initial sealing position; operator means on said mandrel for moving said expander means toward said shoulder into said second position of expanding engagement with said seal means; releasable locking means on said mandrel, said expander means and said operator means for holding said expander means in said second position of engagement with said seal means; and means on said mandrel engageable with said operator means for limiting the movement of said operator means moving said expander means toward said shoulder thereby limiting the compression and expansion of said seal means by said expander means; said locking means when locked preventing movement of said expansible seal means from such initial expanded sealing position, said locking means being releasable upon longitudinal movement of said operator means longitudinally away from said shoulder to permit movement of said expander means from said second position to said first position to free said expansible seal means for movement from such initial expanded sealing position; and conduit means in said seal member providing fluid pressure communication between the exterior of said seal means and the interior thereof for conducting fluid pressure from either direction longitudinally of said seal means to the interior thereof to provide for further expansion of said seal element by such fluid pressure.

5. A sealing device for use in a flow conductor comprising: a mandrel; means providing an upwardly facing shoulder on said mandrel; expansible seal means on said mandrel adjacent said shoulder; an expander element slidably mounted on said mandrel, said expander element being adapted to move into engagement with said seal means and compress said seal means against said shoulder in a longitudinal direction of said mandrel and thereby expand said seal means transversely of said mandrel; a locking sleeve slidably mounted on said mandrel for movement between an uppermost position, an intermediate position and a lowermost position thereon; cooperable stop means on said mandrel and said locking sleeve for limiting longitudinal movement of said locking sleeve relative to said mandrel between said uppermost position and said lowermost position; cooperable locking means on said mandrel, said expander element, and said locking sleeve for locking said expander element against movement relative to said locking sleeve when said locking sleeve is above said intermediate position; means for releasing said locking means when said locking sleeve is at and below said intermediate position, said expander element being in a position of engagement with said seal means when released by said locking means, said seal means being submitted to a predetermined degree of compression by said expander element when said expander element is in said position of engagement, said locking means holding said expander element in said position of engagement with said seal means and maintaining said seal means in said predetermined degree of compression when said locking sleeve is in said lowermost position, said locking sleeve when in said lowermost position limiting movement of said expander means away from said shoulder.

6. A sealing device for use in a flow conductor comprising: a mandrel; means providing an upwardly facing shoulder on said mandrel; expansible seal means on said mandrel adjacent said shoulder; an expander element slidably mounted on said mandrel, said expander element being adapted to move into engagement with said seal means and compress said seal means against said shoulder in a longitudinal direction of said mandrel and thereby expand said seal means transversely of said mandrel; a locking sleeve slidably mounted on said mandrel for movement between an uppermost position, an intermediate position and a lowermost position thereon; cooperable stop means on said mandrel and said locking sleeve for limiting longitudinal movement of said locking sleeve relative to said mandrel between said uppermost position and said lowermost position; cooperable locking means on said mandrel, said expander element, and said locking sleeve for locking said expander element against movement relative to said locking sleeve when said locking sleeve is above said intermediate position; means for releasing said locking means when said locking sleeve is at and below said intermediate position, said expander element being in a position of engagement with said seal means when released by said locking means, said seal means being submitted to a predetermined degree of compression by said expander element when said expander element is in said position of engagement; and cooperable holding means on said mandrel, said expander element, and said locking sleeve for holding said expander element in said position of engagement with said seal means and maintaining said seal means in said predetermined degree of compression.

7. A sealing device for use in a flow conductor comprising: a mandrel; means providing an upwardly facing shoulder on said mandrel; expansible seal means on said mandrel adapted to be supported by said shoulder when said mandrel is disposed with said shoulder facing upwardly; an annular expander element encircling said mandrel and slidably mounted on said mandrel above said seal means, said expander element being adapted to be moved into engagement with said seal means to compress said seal means against said shoulder; a locking sleeve slidably mounted on said mandrel for movement between an uppermost position, an intermediate position, and a lowermost position thereon; cooperable stop means on said mandrel and said locking sleeve for limiting longitudinal movement of said locking sleeve relative to said mandrel between said uppermost position and said lowermost position; cooperable locking means on said mandrel, said expander element, and said locking sleeve for locking said expander element against movement relative to said locking sleeve when said locking sleeve is above said intermediate position, said expander element and locking sleeve being released for relative longitudinal movement when said locking sleeve is at and below said intermediate position, said expander element being in a position of engagement with said seal means when released by said locking means wherein said seal means is compressed to a predetermined degree against said shoulder by said expander element; and cooperable holding means on said mandrel, said expander element, and said locking sleeve for holding said expander element in said position of engagement with said seal means and maintaining said seal means in said predetermined degree of compression.

8. The sealing device of claim 7 wherein said cooperable locking means comprises the external surface of said mandrel, a downwardly facing shoulder of said locking sleeve, and a plurality of balls slidably mounted on said expander element for movement radially of said expander element and adapted to simultaneously engage said downwardly facing shoulder and the external surface of said mandrel for preventing upward movement of said expander element relative to said locking sleeve and a downwardly facing shoulder on said expander element engageable with an upwarding facing shoulder of said locking sleeve for preventing downward movement of said expander element relative to said locking sleeve.

9. The sealing device of claim 7 wherein said cooperable locking means comprises the external surface of said mandrel, a downwardly facing shoulder of said locking sleeve, and a plurality of arcuate-shaped rod segments carried on the upper end of said expander element and adapted to simultaneously engage said downwardly facing shoulder and the external surface of said mandrel for preventing upward movement of said expander element relative to said locking sleeve and a downwardly facing shoulder on said expander element engageable with an upwardly facing shoulder of said locking sleeve for preventing downward movement of said expander element relative to said locking sleeve.

10. A sealing device for use in a tubular flow conductor comprising: a mandrel, said mandrel having an external annular shoulder; a resilient expansible tubular sealing element on said mandrel adjacent said shoulder; expander means on said mandrel at the opposite end of said seal means from said shoulder and movable toward said shoulder for compressing said sealing element against said shoulder to expand said sealing element transversely of said mandrel and into initial sealing engagement with the inner wall of said flow conductor, said sealing element having a bore extending therethrough for receiving said mandrel with the wall of said bore circumferentially engaging the outer surface of said mandrel and an annular recess in the wall of said bore forming an annular chamber between said sealing element and said mandrel, said sealing element having lateral port means communicating the exterior of said sealing element with said annular chamber whereby said sealing element constitutes a pair of oppositely facing cup-type seals for sealing against pressure differentials in either longitudinal direction; said expander means when in a first position on said mandrel being spaced longitudinally of said mandrel from said shoulder a distance greater than the length of said expansible sealing element and movable on said mandrel from said first position to engage and compress said sealing element to a second position on said mandrel near said shoulder wherein said sealing element is held in said transversely expanded position in initial sealing engagement with the inner wall of said flow conductor; operator means slidable on said mandrel and engageable with said expander means for moving said expander means longitudinally of said mandrel from said first position to said second position and from said second position to said first position; locking means on said mandrel, said expander means and said operator means coengageable upon movement of said expander means and said operator means to said second position of said expander means on said mandrel for holding said expander means against longitudinal movement relative to said mandrel away from said shoulder, whereby said sealing element is held in said initial sealing position engaging said flow conductor, said port in said sealing element admitting fluid pressure from either direction longitudinally of said sealing element into the bore thereof for further pressure setting said sealing element to prevent flow of fluids past said element in either direction longitudinally exteriorly of said mandrel; said locking means being releasable upon longitudinal movement of said operator means relative to said mandrel away from said shoulder to free said expander means for movement from said second position to said first position to release said sealing element from mechanical compression; and means on said mandrel engageable with said operator means for limiting movement of said operator means moving said expander means toward said shoulder to limit compression of said sealing element by said expander means.

References Cited by the Examiner
UNITED STATES PATENTS

| | | | |
|---|---|---|---|
| 321,488 | 7/85 | Dayhuff | 166—200 |
| 1,736,254 | 11/29 | Davis | 166—198 |
| 2,092,843 | 9/37 | Henderson | 166—198 X |
| 2,196,668 | 4/40 | Ragan | 166—204 X |
| 2,878,876 | 3/59 | Long | 166—201 |
| 2,885,009 | 5/59 | Baker | 166—204 |
| 2,896,724 | 7/59 | Baker | 166—204 |
| 2,988,148 | 6/61 | Conrad et al. | 166—187 |
| 3,036,639 | 5/62 | Baker | 166—201 |

CHARLES E. O'CONNELL, *Primary Examiner.*

BENJAMIN BENDETT, *Examiner.*